Figure 1:
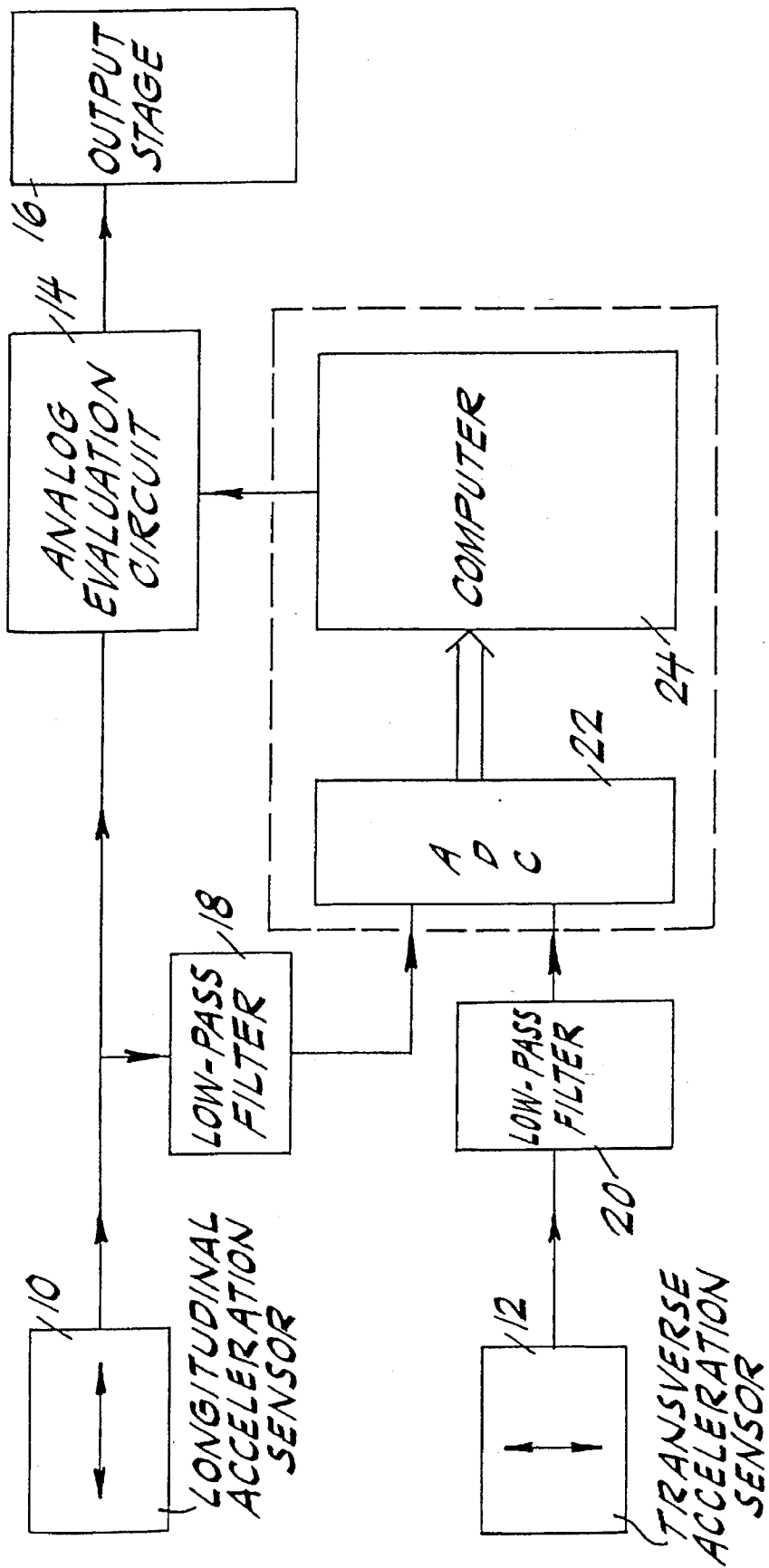

United States Patent [19]

Jeenicke et al.

[11] Patent Number: 5,620,203
[45] Date of Patent: Apr. 15, 1997

[54] APPARATUS AND METHOD FOR TRIPPING A SAFETY SYSTEM FOR THE PROTECTION OF AN OCCUPANT OF A VEHICLE

[75] Inventors: Edmund Jeenicke, Luxemburg, Luxembourg; Bernhard Mattes, Sachsenheim 1; Claus Condne, Wadgassen, both of Germany

[73] Assignee: Robert Bosch GmbH, Stuttgart, Germany

[21] Appl. No.: 485,300

[22] Filed: Jun. 7, 1995

Related U.S. Application Data

[63] Continuation of Ser. No. 166,169, Dec. 10, 1993, Pat. No. 5,449,198, which is a continuation of Ser. No. 623,945, filed as PCT/EP88/00508 Jun. 9, 1988, abandoned.

[51] Int. Cl.$^6$ ............................................. B60R 21/32
[52] U.S. Cl. .................................... 280/735; 307/10.1
[58] Field of Search ................................. 280/734, 735; 307/10.1; 340/436; 364/426.01

[56] References Cited

U.S. PATENT DOCUMENTS 4,287,765  9/1981  Kreft.

| 4,497,025 | 1/1985 | Hannoyer | 280/735 |
| 4,668,875 | 5/1987 | Miyazaki et al. | 307/10.1 |
| 4,836,024 | 6/1989 | Woehrl et al. | 307/10.1 |
| 5,182,459 | 1/1993 | Okano et al. | 280/735 |

FOREIGN PATENT DOCUMENTS

| 7331/75 | 3/1975 | Japan. |
| 23901/75 | 8/1975 | Japan. |

*Primary Examiner*—Eric D. Culbreth
*Attorney, Agent, or Firm*—Kenyon & Kenyon

[57] ABSTRACT

An apparatus and method for actuating a safety system for protecting an occupant of a motor vehicle measures the acceleration of the vehicle with a first sensor along a first axis oriented substantially parallel to the forward direction of motion of the vehicle. The acceleration of the vehicle is also measured with a second sensor along a second axis oriented at an angle relative to the first axis. The acceleration signal generated by the first sensor is evaluated by an analog processor and the acceleration signal generated by the second sensor is evaluated by a digital processor. The safety system is then actuated based upon both the analog and digital evaluations.

19 Claims, 2 Drawing Sheets

APPARATUS AND METHOD FOR TRIPPING A SAFETY SYSTEM FOR THE PROTECTION OF AN OCCUPANT OF A VEHICLE

This application is a continuation of application Ser. No. 08/166,169, filed Dec. 10, 1993, now U.S. Pat. No. 5,449,198 which in turn is a continuation of application Ser. No. 07/623,945, filed Feb. 11, 1991 which is a continuation of PCT/EP88/00508 filed Jun. 9, 1988.

STATE OF THE ART

The present invention relates to an apparatus and method for tripping safety systems for the protection of an occupant of a vehicle, in which the acceleration of the vehicle is measured along a first axis oriented substantially parallel to the forward direction of the vehicle and is measured along a second axis oriented at an angle relative to the first axis.

Systems are known which have one or more acceleration sensors which measure the acceleration of the vehicle both in the direction of travel and also at right angles thereto. After suitable processing, the signals serve to trip corresponding safety systems, such as inflatable airbags, the tightening of seat belts, central door locking and flashing warning systems.

The signals from the sensors may be processed by analog systems or by digital systems. Analog processing has the advantage of rapid and reasonably accurate processing of the signals, and thus has the advantage of speed over digital systems (which require computer processing) in the event of a very violent impact.

On the other hand, computer processing makes it possible to utilize more expensive and more accurate evaluation methods, but has the disadvantages of increased cost and increased processing time. The latter disadvantage must particularly be taken into consideration since it is necessary to detect an acceleration for which tripping is required as soon as possible.

It is an object of the present invention to provide an apparatus and method for tripping the safety system, which utilizes as far as possible the advantages of both analog and digital processing.

ADVANTAGES OF THE INVENTION

The above object is achieved by the device and method according to the present invention, which has the advantage of utilizing both the rapid reaction time of analogue processing and the accuracy of digital processing.

DRAWINGS

Figure 2:
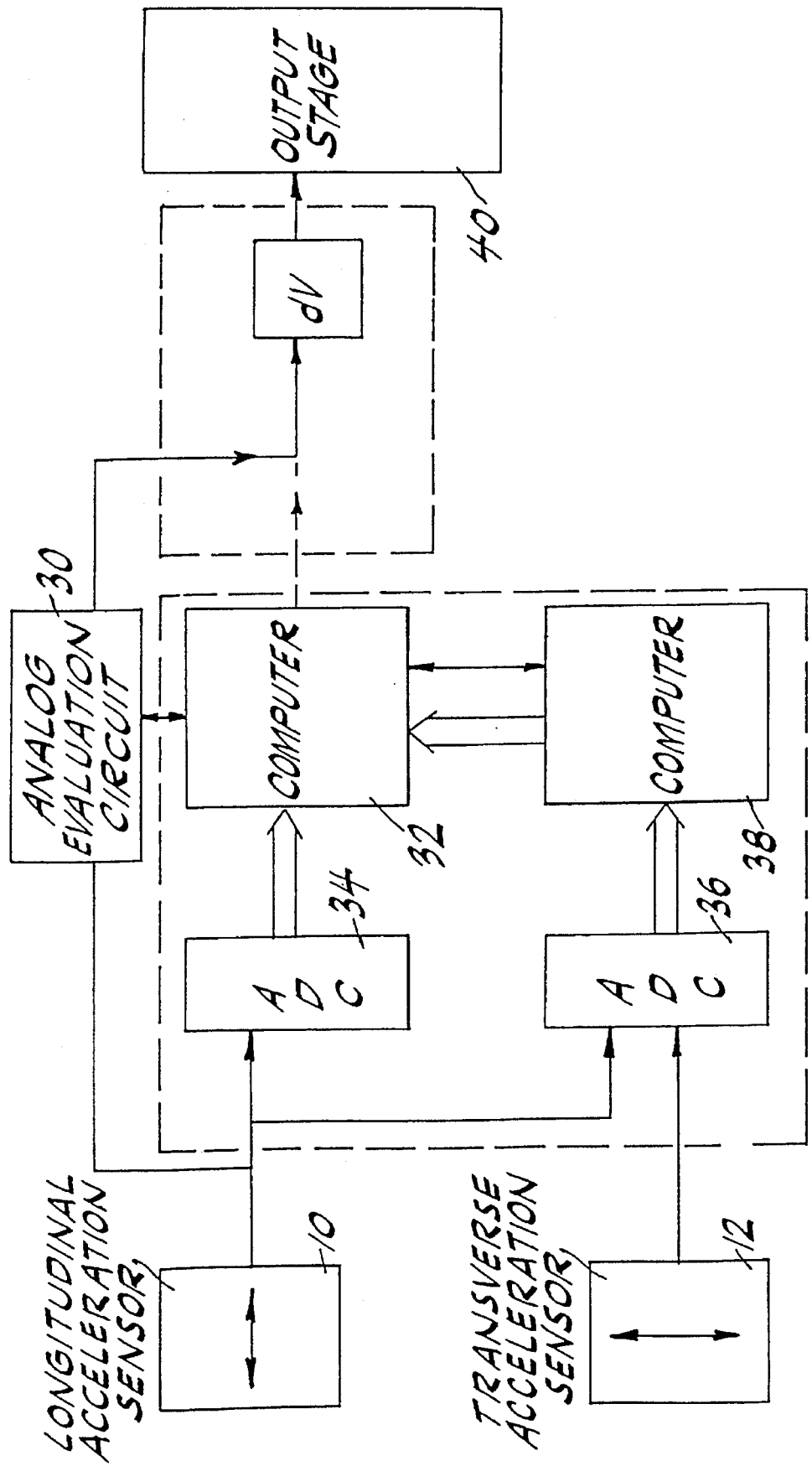

By way of example only, specific embodiments of the present invention will now be described, with reference to the accompanying drawings, in which:

FIG. 1 is a diagrammatic representation of a first embodiment of a device for tripping safety systems, in accordance with the present invention; and FIG. 2 is a diagrammatic representation of a second embodiment of a device for tripping safety systems, in accordance with the present invention.

DESCRIPTION OF EXEMPLARY EXAMPLES

Referring firstly to FIG. 1, the device comprises longitudinal acceleration sensor 10, for detecting the acceleration of the vehicle in a direction parallel to the forward direction of motion of the vehicle, and a transverse acceleration sensor 12, for detecting the acceleration of the vehicle in an axis substantially perpendicular to the aforementioned axis (hereinafter referred to as the transverse direction). The analog output of the longitudinal acceleration sensor 10 is fed to an analog evaluation circuit 14 which evaluates the main acceleration signal (in the direction of forward travel of the vehicle) by known methods. If the evaluation circuit 14 determines that the acceleration in the longitudinal direction is greater than a predetermined value, then an actuating signal is fed to an output stage 16 which in turn trips the safety system (for example an inflatable airbag).

In this way, when the longitudinal acceleration above a certain threshold value, the safety device is actuated.

The output of each of the sensors 10, 12 is fed to a respective low-pass filter 18, 20. The limiting frequency of the low-pass filters is chosen such that it does not serve solely for the evaluation of the acceleration signal. Only the higher frequencies which contain more accurate information (which is not ascertainable from the analog signal) are integrated. Pre-processing is thus achieved in a desired manner, with the resultant advantage that the signal scan frequency can be reduced, and more time-consuming computing algorithms can be used for the subsequent evaluation of the two signals.

The output from both of the low-pass filters 18, 20 is fed to an analog to digital converter (ADC) 22, wherein the signals are converted to digital signals. The now digital signals are then fed into a digital computer 24, which evaluates the acceleration signals from the sensors 10, 12 digitally.

The process evaluation signal is then fed to the analog evaluation circuit 14 via a digital to analog converter (DAC) (not illustrated). Depending upon the evaluations made by the computer 24, the analog evaluation circuit 14 may determine that a signal ought to be sent to the output stage 16, even if the value of the longitudinal acceleration is not sufficient by itself for the safety device to be triggered. For example, the relative values of the longitudinal and transverse acceleration of the vehicle, as evaluated digitally in the computer 24 may be such that the overall acceleration is sufficiently large to warrant tripping of the safety device. This may occur, for example, in an oblique impact, where the longitudinal acceleration itself may not be sufficient to trip the safety device, but the magnitude of the acceleration total is such that actuation of the safety device is desirable.

The second embodiment of the present invention illustrated in FIG. 2. Longitudinal and transverse acceleration sensors 10, 12 are provided, as in the first embodiment.

The output from the longitudinal acceleration sensor 10 is fed into an analog evaluation circuit 30. The output of the analog evaluation circuit 30 is fed firstly to a tripping threshold switch dV, and secondly via a low-pass filter and ADC (not illustrated) to a first computer 32 of the digital processing system.

The output of the longitudinal acceleration sensor 10 is also fed via a low-pass filter (not illustrated) to an ADC 34, and thence into the firs t computer 32. The outputs of the longitudinal and the transverse sensors 10, 12, respectively, after passing through respective low-pass filters (not illustrated) are fed into a second ADC 36, and thence into a second computer 38.

The digital circuitry thus calculates the longitudinal acceleration digitally in the computer 32. The longitudinal and trans verse accelerations are also compared in the second computer 38, and this information is fed into the first computer 32. The output of the computer 32 is fed to the tripping threshold switch dV, which actuates an output stage 40 to trip the vehicle safety device if a suitable signal is fed therein.

Triggering of the safety system can occur in one of three general ways. Firstly, either the signal of the analog channel or the longitudinal signal of the digital channel can determine that a threshold acceleration has been reached, and a suitable signal is sent to the threshold switch dV which operates to actuate the safety device. In this situation, it will normally be the analog channel which produces its signal first of all, due to its faster processing. However, in borderline cases the analog channel may not be sufficiently accurate to determine that a threshold acceleration has been reached, whereas the more accurate digital channel is capable of doing so. Thus, in certain borderline cases it may be the digital channel which triggers the actuation of the safety device, albeit slightly later than would have occurred for the analog channel.

Secondly, the digit al processor may reach a tripping threshold by it self, the analog channel signal not reaching the longitudinal acceleration threshold. This may occur, for exam pie, in an oblique impact, where a significant acceleration is experienced by the vehicle in the transverse direction. In this case neither the analog processing circuitry 30 nor the first computer 32 would detect a longitudinal acceleration threshold, but the second computer 38, on comparing the longitudinal and transverse accelerations, would inform the computer 32 that actuation of the safety device is warranted and the computer 32 would output a suitable signal to the threshold switch dV accordingly. In this second case, the threshold switch dV is preferably arranged to provide a tripping signal from the digital circuitry, only if a signal from the analog channel is also received. Such a signal from the analog channel indicates that there is a component of the vehicle acceleration in the longitudinal direction, and this provision helps to ensure against the possibility of incorrect calculation by one of the computers 32, 34, and subsequent incorrect tripping. A predetermined value of the longitudinal acceleration calculated by the analog circuit is preferably specified in this case.

The third case is that the tripping threshold switch dV is actuated only by the analog channel, but the connection between the computer 32 of the digital circuitry and the analog evaluation circuitry 30 allows the digitally-calculated signals to influence the evaluation carried out by the analog evaluation circuit 30. This is why the connection between the computer 32 and the tripping threshold switch dV has been dotted, since in this case there would be no direct connection from the computer 32 (or, indeed, any of the digital circuitry) and the tripping threshold switch dV. In this case, the tripping threshold switch dV can be actuated only by the analog evaluation circuitry 30, but the analog circuit 30 can, in turn, be influenced by the digital circuits. For example, the analog circuit 30 may calculate that the longitudinal acceleration is not of sufficient value to initiate tripping of the safety device. However, the digital circuitry may calculate that the overall acceleration (or, for example, the relative longitudinal and transverse accelerations) is of sufficient value to warrant actuation of the safety device. In this case, the information from the digital circuitry would be fed into the analog circuit 30 and the analog circuit, depending on the information fed into it from the digital circuitry, would send a suitable actuation signal to the tripping threshold switch dV.

The present invention is suitable in all types of impact as follows.

1. Rapid Frontal Impact

The characteristic of such an impact is a very rapid and high increase in the tripping signal. Such impact requires rapid evaluation of the longitudinal acceleration. This can be achieved either by taking the analog signal directly, or by processing the acceleration in the computer 32 and merely having the analog signal as a "confirmation" or back-up signal. As stated previously, the latter situation might be of benefit if the value of the acceleration was a borderline case.

2. Slow Frontal Impact

This type of impact has a rapid but small increase the tripping signal. This requires rapid and accurate evaluation of the longitudinal acceleration. This is preferably achieved by processing in the computer 32, provided that the additional analog tripping circuit 30 reaches the low threshold described previously. A further check on the plausibility of the calculated signal may be made by the computer 38, which calculates the values of the longitudinal and transverse accelerations and feeds this information into the computer 32.

3. Oblique Impact (e.g. 30°)

This type of impact has a slow and variable increase in the longitudinal tripping threshold signal, less in the initial phase than in the case of a slow frontal impact. Relatively slow but accurate evaluation of the acceleration is required. This is achieved by computer 32 (provided the additional analogue tripping circuit reaches the low threshold) to evaluate the longitudinal signal, and computer 38 which is used to calculate the transverse signal, and feed this information to computer 32.

4. Rear Impact

This type of impact has an increase in the tripping signal in a negative direction, and an increase in a positive direction at the end of the crash (high-pass behavior). No tripping is desired in such an impact, and this is achieved by the computer 32 being able to integrate in both directions.

5. Side Impact

Such an impact has the characteristic of a large transverse signal. No tripping of the safety system is desirable or required in such an impact. This is achieved by computer 38 which blocks computer 32, since the ratio of the longitudinal and transverse accelerations is not within the actuation threshold. Even if computer 38 gave a false signal, there would still be the emergency longitudinal back-up provided by the analog circuit 30.

The present invention is particularly suitable for safety devices such as inflatable airbags and the actuation (i.e. locking) of seatbelts. However, it may also be used to actuate flashing warning light systems, unlock the doors centrally, or to actuate other safety features.

I claim:

1. A system for activating an occupant protection device of a vehicle, comprising:

an acceleration sensor for detecting an acceleration of the vehicle and for generating an acceleration signal indicative of the detected acceleration;

a digital determination device for receiving the acceleration signal, for determining, in a digital manner, an occurrence of a collision of the vehicle in response to the acceleration signal, and for generating a first trigger signal based upon the digital determination;

an analog determination device for receiving the acceleration signal, for determining, in an analog manner, an occurrence of a collision of the vehicle in response to the acceleration signal, and for generating a second trigger signal based upon the analog determination; and a control device for receiving the first and second trigger signals and for controlling activation of the occupant protection device as a function of at least one of the first and second trigger signals.

2. The system according to claim 1, wherein the control device controls activation of the occupant protection device as a function of both the first and second trigger signals.

3. A method of activating an occupant protection device of a vehicle, comprising the steps of:

detecting an acceleration of the vehicle;

generating an acceleration signal indicative of the detected acceleration;

determining, in a digital manner, an occurrence of a collision of the vehicle in response to the acceleration signal;

generating a first trigger signal based upon the digital determination;

determining, in an analog manner, an occurrence of a collision of the vehicle in response to the acceleration signal;

generating a second trigger signal based upon the analog determination; and controlling activation of the occupant protection device as a function of at least one of the first and second trigger signals.

4. The method according to claim 3, wherein activation of the occupant protection device is controlled as a function of both the first and second trigger signals.

5. The method according to claim 3, wherein the second trigger signal is generated as a function of the first trigger signal.

6. A system for actuating a safety device for the protection of an occupant of a vehicle, comprising:

a first sensor adapted to generate a first signal indicative of an acceleration of the vehicle along a first axis;

a second sensor adapted to generate a second signal indicative of an acceleration of the vehicle along a second axis oriented at an angle relative to the first axis;

a controller including a digital collision determination device and an analog collision determination device, each of the digital and analog collision determination devices being coupled to at least one of the first sensor and the second sensor, the controller being adapted to control actuation of the safety device as a function of the first and second signals, the safety device being actuated if the value of the first signal exceeds an actuation threshold value, regardless of the value of the second signal.

7. The system according to claim 6, wherein the second axis is oriented at a right angle relative to the first axis.

8. The system according to claim 6, wherein the first axis is oriented in a direction of forward motion of the vehicle.

9. A system for actuating at least one safety device for the protection of an occupant of a vehicle, comprising:

a first sensor for sensing an acceleration of the vehicle along a first axis and for generating a first acceleration signal based thereon;

a second sensor for sensing an acceleration of the vehicle along a second axis oriented at an angle relative to the first axis and for generating a second acceleration signal based thereon;

an analog collision determination device coupled to the first sensor for receiving the first acceleration signal and for determining, in an analog manner, an occurrence of a collision of the vehicle and the value of a first trigger signal indicative of whether the safety device should be actuated in response to the first acceleration signal; and a digital collision determination device coupled to the second sensor for receiving the second acceleration signal and for determining, in a digital manner, an occurrence of a collision of the vehicle and the value of a second trigger signal indicative of whether the safety device should be actuated in response to the second acceleration signal;

wherein the safety device is actuated as a function of the first and second trigger signals.

10. The system according to claim 9, wherein the first axis is oriented in a direction of forward motion of the vehicle.

11. The system according to claim 10, wherein the second axis is oriented at a right angle relative to the first axis.

12. The system according to claim 9, wherein the safety device is actuated when the first acceleration signal exceeds a threshold value.

13. The system according to claim 9, wherein the digital collision determination device is coupled to the analog collision determination device.

14. The system according to claim 9, further comprising at least one low-pass filter, the low-pass filter feeding the first and second acceleration signals to the digital collision determination device.

15. A system for actuating at least one safety device for the protection of an occupant of a vehicle, comprising:

a first sensor for sensing an acceleration of the vehicle along a first axis and for generating a first acceleration signal based thereon;

a second sensor for sensing an acceleration of the vehicle along a second axis oriented at an angle relative to the first axis and for generating a second acceleration signal based thereon;

an analog determination device coupled to the first sensor for receiving the first acceleration signal and for determining, in an analog manner, the value of a first trigger signal indicative of whether the safety device should be actuated in response to the first acceleration signal; and a digital determination device coupled to the second sensor for receiving the second acceleration signal and for determining, in a digital manner, the value of a second trigger signal indicative of whether the safety device should be actuated in response to the second acceleration signal;

wherein the safety device is actuated as a function of the first and second trigger signals;

wherein the safety device is actuated when the digital determination device determines that the safety device should be actuated based upon the second acceleration signal.

16. A system for actuating at least one safety device for the protection of an occupant of a vehicle, comprising:

a first sensor for sensing an acceleration of the vehicle along a first axis and for generating a first acceleration signal based thereon;

a second sensor for sensing an acceleration of the vehicle along a second axis oriented at an angle relative to the first axis and for generating a second acceleration signal based thereon;

an analog determination device coupled to the first sensor for receiving the first acceleration signal and for determining, in an analog manner, the value of a first trigger signal indicative of whether the safety device should be actuated in response to the first acceleration signal; and a digital determination device coupled to the second sensor for receiving the second acceleration signal and for determining, in a digital manner, the value of a second trigger signal indicative of whether the safety device should be actuated in response to the second acceleration signal;

wherein the safety device is actuated as a function of the first and second trigger signals;

wherein the safety device is actuated when the analog determination device determines that the safety device should be actuated based upon the first acceleration signal.

17. A method of actuating at least one safety device for the protection of an occupant of a vehicle, comprising the steps of:

sensing an acceleration of the vehicle along a first axis and generating a first acceleration signal based thereon;

sensing an acceleration of the vehicle along a second axis oriented at an angle relative to the first axis and generating a second acceleration signal based thereon;

determining, in an analog manner, an occurrence of a collision of the vehicle and the value of a first trigger signal indicative of whether the safety device should be actuated in response to the first acceleration signal;

determining, in a digital manner, an occurrence of a collision of the vehicle and the value of a second trigger signal indicative of whether the safety device should be actuated in response to the second acceleration signal; and actuating the safety device as a function of the first and second trigger signals.

18. The method according to claim 17, wherein the first axis is oriented substantially parallel to the forward direction of motion of the vehicle.

19. The method according to claim 17, wherein the value of the first trigger signal is determined as a function of the value of the second trigger signal.

* * * * *